United States Patent [19]

Meilhon et al.

[11] Patent Number: 5,356,677
[45] Date of Patent: Oct. 18, 1994

[54] SHRINKABLE THERMOPLASTIC PACKAGING FILMS

[75] Inventors: Daniel Meilhon, Sort-en-Chalosse, France; Herbert F. Wollak, Plan-les-Ouates (GE), Switzerland

[73] Assignees: Sodap, Dax-Cedex, France; Du Pont de Nemours International S.A., Geneva, Switzerland

[21] Appl. No.: 958,705

[22] Filed: Oct. 9, 1992

[30] Foreign Application Priority Data

Oct. 11, 1991 [FR] France .................................. 91 12554

[51] Int. Cl.$^5$ ............................................ B65B 53/00
[52] U.S. Cl. .................................... 428/34.9; 428/349; 428/516; 428/913; 428/332
[58] Field of Search ................ 428/516, 349, 34.9, 428/913; 206/497, 558

[56] References Cited

U.S. PATENT DOCUMENTS

| | | | |
|---|---|---|---|
| Re. 30,726 | 9/1981 | Otten et al. | 428/515 |
| 3,344,975 | 10/1967 | Stoker, Jr. | 229/51 |
| 4,801,486 | 1/1989 | Quacquarella et al. | 428/34.9 |
| 4,865,902 | 9/1989 | Golike et al. | 428/516 |
| 4,913,977 | 4/1990 | Taka et al. | 428/34.9 |
| 5,139,805 | 8/1992 | Tada et al. | 428/34.9 |
| 5,173,343 | 12/1992 | Arvedson | 428/34.9 |

FOREIGN PATENT DOCUMENTS

| | | |
|---|---|---|
| 0206826 | 12/1986 | European Pat. Off. . |
| 0229715 | 7/1987 | European Pat. Off. . |
| 0372886 | 6/1990 | European Pat. Off. . |

*Primary Examiner*—Edith Buffalow
*Attorney, Agent, or Firm*—Burns, Doane, Swecker & Mathis

[57] ABSTRACT

Heat-shrinkable coextrudate thermoplastic film packaging materials, well suited for the packaging of any one or more of a wide variety of articles, e.g., canned goods, and readily torn in a transverse direction substantially perpendicular to the machine direction thereof, include (a) at least one layer of a polyolefin; and (b) at least one layer of an ionic copolymer which comprises the copolymerizate of (1) an α-olefin of formula R—CH=CH$_2$ wherein R is hydrogen or an alkyl radical having from 1 to 8 carbon atoms, with (2) an α,β-ethylenically unsaturated carboxylic acid having from 3 to 8 carbon atoms, and, optionally, (3) at least one other monoethylenically unsaturated comonomer, with the proviso that from 10% to 90% of the carboxylic acid functional groups of said copolymer are ionized by means of metallic ions distributed over the copolymer, and such films are shaped by coextrusion of (a) the polyolefin layer and (b) the ionic copolymer layer under the following operations conditions:

(i) a lengthwise stretch ratio of 2 to 25; and
(ii) a frost line height of less than 160 cm; the ratio $$\frac{\text{Lengthwise stretch ratio}}{\text{Frost line height (in cm)}}$$

being such as to provide a ratio of:

$$\frac{\text{Elmendorf tear strength in machine direction}}{\substack{\text{Elmendorf tear strength in} \\ \text{substantially perpendicular direction}}}$$

greater than or equal to 2.

31 Claims, No Drawings

SHRINKABLE THERMOPLASTIC PACKAGING FILMS

CROSS-REFERENCE TO COMPANION APPLICATION

Copending application Ser. No. 07/958,735 [Attorney Docket No. 004895-005], filed concurrently herewith.

BACKGROUND OF THE INVENTION

1. Field of the Invention

The present invention relates to bulk shrinkable thermoplastic packaging films particularly suitable for bundling unit packs of individual articles to be packaged, such as canned foods, other cans, bottles or the like, as well as to a method for producing these films and to the final product packaged items, per se.

2. Description of the Prior Art

For packaging and storing groups of times of widely varying types, thermoplastic films have long been used in lieu of the conventional cardboard boxes for bundling a plurality of identical or different articles to form a unitary pack. It is thus common to, for example, find packs of very many different types of articles on the market such as canned food, bottles, or cans in a packaging consisting only of shrinkable plastics film.

Such unitary packs are provided in known manner by bundling. Bundling is a technique which entails enveloping the totality of the items to be packaged with a shrinkable thermoplastic reins film which can be welded to itself such as to form a sleeve around the grouped items. The film is then shrunk by, for example, transferring the entire assembly through an oven at a temperature that permits the thermoplastic resin constituting the film to soften, thus relieving internal stresses. Upon exiting the oven, rapid cooling ensures that the film shrinks tightly and sealedly around the items contained therein. Thus, a highly homogeneous bundle or unitary pack is produced in which the thermoplastic film functions as a skin in tight contact with the surface of the packaged items.

All thermoplastic polymers or copolymers, in the form of shrinkable films, having a sufficient tear resistance can be employed for this type of application. Nevertheless, the polyolefins and, more particularly, polyethylene or polypropylene, or even copolymers of ethylene and propylene and an olefinically unsaturated monomer such as vinyl acetate, are those that are most frequently used industrially.

The shrinkability and tear resistance properties required of such thermoplastic films present, in the case of known films, certain disadvantages when the packaged items are being unpacked or removed. In particular, it is necessary, in light of the fact that the film is difficult to tear, to exert a quite significant force in order to stretch the film packaging to provide a vehicle for removing the items contained in the package. It may even sometimes be necessary to employ a cutting tool, which is dangerous, particularly in the home, with concomitant risk of damaging or destroying the packaged items.

If the packaging film is indeed torn, the tear is quite random and cannot be controlled, often resulting in the items falling out of the pack or, yet again, the tearing is in the direction of extrusion of the film. This latter property presents no advantages or interest whatsoever. In effect, shrinkable thermoplastic films employed in this packaging application are produced by extrusion, followed by winding onto a large roll. When the film is actually used, the items are packaged in the direction of the length of the film as it progressively unwinds from the roll. Under these conditions, the tear properties of the film in the direction of extrusion in other words along the length of the film or "machine direction", do not in any way facilitate the subsequent complete opening of the package.

U.S. Pat. Re. 30,726 describes blow extrusion into films of mixtures of polyethylene and ionomer resins. Such films have tear properties in the extrusion direction, in other words in the direction of the production machine. This film suffers from the disadvantages indicated above. Such a film can only be employed for packaging items of small size, e.g., packets of chewing-gum or cigarettes, and cannot be employed for the continuous bundling of larger objects such as bottles, unitary packs, etc. Moreover, during handling of larger size articles, the purchaser grasps the packaging by the crescent-shaped opening provided in the sides of the pack. In the event that the film possesses tear properties in the direction of the production machine, the packaging tears when it is handled by these openings. Hence, a serious need continues to exist in the packaging industry to provide a film which can be readily torn, but which retains the necessary strength for bundling.

SUMMARY OF THE INVENTION

Accordingly, a major object of the present invention is the provision of an improved shrinkable thermoplastic packaging film simultaneously having the characteristics required for bundling and the characteristics required for unpacking.

Briefly, the present invention features a heat-shrinkable thermoplastic packaging film shaped from at least two different thermoplastic resins, the direction of tear of which is substantially perpendicular to its direction of extrusion. The shrinkable thermoplastic film of the present invention, moreover, tears substantially along a straight line.

DETAILED DESCRIPTION OF THE PREFERRED EMBODIMENTS OF THE INVENTION

More particularly according to the present invention, by the expression "substantially perpendicular" is intended that the tearing is effected in a direction which deviates from the perpendicular by less than 20°.

Preferably, such deviation is less than 10°.

By the expression "substantially along a straight line" is intended that the tearing takes place along a line which is straight and only includes small amplitude waviness along the edge of the tear.

Tear resistance is determined by the Elmendorf tear test and is expressed in N/mm.

The shrinkable thermoplastic film according to the present invention exhibits the same resistance to tearing as the other known films in directions other than the substantially perpendicular direction, whether, for example, in an oblique direction, or in the direction of extrusion or of the production machine, namely, along the length of the film.

This characteristic of the subject shrinkable thermoplastic film, i.e., ability to tear substantially perpendicularly to the direction of extrusion, it being understood that the "direction of extrusion" corresponds to the direction of the length of the film when exiting the extrusion machine, as well as to tear cleanly and substantially along a straight line, is a direct result of the particular method for producing this film that is employed according to the present invention.

Thus, the present invention feature a shrinkable thermoplastic film that tears in the direction substantially perpendicular to the direction of extrusion, the tear being substantially in a straight line, such film comprising:

(a) at least one layer of a polyolefin;
(b) at least one layer of a copolymer selected from among ionic copolymers of:
 (1) α-olefins of formula R-CH=CH$_2$ wherein R is a hydrogen atom or an alkyl radical having 1 to 8 carbon atoms,
 (2) α,β-ethylenically unsaturated carboxylic acids having 3 to 8 carbon atoms, and
 (3) optionally, an additional monoethylenically unsaturated comonomer compound;

with the proviso that from 10% to 90% of the carboxylic acid functional groups of said copolymers are ionized by neutralization via metallic ions distributed over the copolymer, and said film having been produced by blow coextrusion of:

(a) said polyolefin layer; and
(b) said ionic copolymer layer; with blow coextrusion being carried out under the following operating conditions:
 (i) a lengthwise stretch ratio of from 2 to 25; and
 (ii) a frost line height of less than 160 cm; the ratio $$\frac{\text{Lengthwise stretch ratio}}{\text{Frost line height (in cm)}}$$

being such as to provide a ratio of:

$$\frac{\text{Elmendorf tear strength in machine direction}}{\text{Elmendorf tear strength in substantially perpendicular direction}}$$

greater than or equal to 2.

Preferably:

The extrusion screw temperature for the ionic copolymer ranges from 165° to 220° C.;

The extrusion screw temperature for the polyolefin ranges from 170° to 220° C.;

The extrusion die temperature ranges from 175° to 230° C.;

The blow ratio ranges from 1 to 4;

The winding speed ranges from 5 to 80 m/min;

The die block gap ranges from 0.6 to 2.0 mm.

The ionic copolymers employed exhibit, when in the solid state, the characteristic properties of crosslinked polymers and, when in the softened state, the structural properties of non-crosslinked thermoplastic polymers.

The metallic ions generally have an ionized valency of from 1 to 3, inclusive, when the unsaturated acid is a monocarboxylic acid and an ionized valency of 1 when the unsaturated acid is a dicarboxylic acid. The metallic ions can be selected from among the complexed and non-complexed metallic ions.

The preferred ionic copolymers are copolymers in which the α-olefin is ethylene and the α,β-ethylenically unsaturated carboxylic acid is a monocarboxylic or dicarboxylic acid and in which the metallic ions are complexed metallic ions, are metals of Groups II, III, IV-A and VIII of the Periodic Table, or are ions of a metal of Group I of the Periodic Table and, more particularly, an alkali metal ion, which advantageously is sodium.

These ionic copolymers are per se known. They are described, as well as a process for the production thereof, in U.S. Pat. No. 3,264,272, hereby expressly incorporated by reference.

Such copolymers are produced and marketed by E.I. Du Pont under the trademark Surlyn ®, for example. A preferred copolymer is Surlyn ® 1601.

By the expression "polyolefin" are intended homopolymers of α-olefins or copolymers of such olefins with one or more comonomers, as well as mixtures thereof.

The homopolymer that is associated with the ionic copolymer is advantageously a polymer of an α-olefin of the formula R'-CH=CH$_2$ in which R' is a hydrogen atom or an alkyl radical having 1 to 8 carbon atoms.

The α-olefin copolymer is preferably a copolymer of an α-olefin of the above formula R'-CH=CH$_2$ with at least one additional monoethylenically unsaturated monomer, such as an aliphatic or aromatic monomer; exemplary thereof are vinyl acetate, styrene, and (meth-)acrylic derivatives. Such other monomer constitutes up to 20% by weight of the olefinic copolymer, preferably from 1% to 10% by weight.

From an economic standpoint, preferred are polymers and copolymers of ethylene and propylene, such as polyethylene, polypropylene, copolymers of ethylene and propylene, ethylenevinyl acetate copolymers, copolymers of ethylene and acrylic derivatives, terpolymers based on olefin, methyl acrylate and ethyl acrylate, or even mixtures of linear and branched low density polyolefins, as well as mixtures of the above (co)-polymers.

One polyolefin in its preferred homopolymer form is low density polyethylene (LDPE). Another preferred polyolefin is a mixture of low density polyethylene and high density polyethylene (LDPE/HDPE). Their weight ratio is preferably in the range of 95/5 to 50/50.

The polyolefin in its preferred copolymer form is an ethylene/vinyl acetate (EVA) copolymer.

In one embodiment of the present invention, the shrink film is a two-layer film comprising a polyolefin layer and an ionic copolymer layer.

In another embodiment of the invention, the film is a multilayer film comprising a plurality of layers of polyolefin and of ionic copolymer.

The total thickness of the shrink film according to the invention advantageously ranges from 20 to 300 μm, preferably from 40 to 150 μm.

In another embodiment, the total thickness of ionic copolymer, whether in one or several layer form, is 5% to 70%, preferably from 15% to 40% of the total film thickness.

When the film comprises at least three layers, how the various polyolefin and ionic copolymer layers are arranged with respect to each other is not important. How they are arranged with respect to each other has no effect on tearing in the direction transverse to the film extrusion direction.

In another embodiment of the present invention, the film has two layers, the ionic copolymer layer preferably constituting about 20% of the thickness.

In another embodiment of the present invention, the film has three layers, the two outer layers being constituted of ionic copolymer and each representing 10% to 25% of the total thickness of the film.

In another embodiment of the invention, the film has three layers, the inner layer being constituted of ionic copolymer and representing 10% to 35% of the total thickness of the film.

The inclusion of an adhesive binder or adhesive between the polyolefin layer and the ionic copolymer layer to optionally increase the adhesion between the layers of different natures is also within the scope of the invention. Such binders are known to this art and currently are employed in conventional coextrusion processes; typically, such binders are modified ethylene-based copolymers or terpolymers.

The film according to the present invention is produced by coextruding;
(a) at least one polyolefin layer; and
(b) at least one layer of an ionic copolymer.

The polyolefin and the ionic copolymer are coextruded under particular conditions that yield the subject films. Upon discharge from the die, the film is cooled on a cylinder, the speed of rotation of which is greater than the film discharge rate, whereby the latter is subject to longitudinal orientation. At the outlet of the flat die, it is also possible, by employing known techniques, to subject it to flat biaxial stretching.

The conditions under which the blow coextrusion is carried out are as follows: extruder temperature for the ionic copolymer advantageously ranges from 165° to 220° C., preferably from 170° to 180° C.; extruder temperature for the polyolefin advantageously ranges from 170° to 220° C., preferably from 175° to 185° C.; the temperature of the extrusion die advantageously ranges from 165° to 230° C., preferably from 170° to 190° C.; the blow ratio advantageously ranges from 1 to 4, and preferably from 1.5 to 2.5.

The blow ratio is defined as:

$$\frac{\text{bubble diameter}}{\text{die head diameter}}$$

The winding speed advantageously ranges from 5 to 80 m/min, and preferably from 7 to 50 m/min. The extrusion gap advantageously ranges from 0.6 to 2.0 mm, preferably from 1 to 1.6 mm.

The lengthwise stretch ratio advantageously ranges from 2 to 25, preferably from 4 to 15, and more preferably from 5 to 10. The lengthwise stretch ratio is defined as:

$$\frac{\text{winding speed of the solid film}}{\text{speed of the melt at die exit}}$$

The frost line height, employed to attain rapid cooling to provide crystallization in the same direction is advantageously less than 160 cm, preferably less than 80 cm, and particularly preferably ranges from 20 to 40 cm.

The film according to the invention is produced by varying the lengthwise stretch ratio and frost line height parameters to provide a ratio:

$$\frac{MD}{TD} = \frac{\text{Elmendorf tear strength in machine direction}}{\text{Elmendorf tear strength in substantially perpendicular direction}}$$

greater than or equal to 2, preferably greater than 5.

The actual MD/TD Elmendorf tear ratios provided will vary based on changes in a number of other conditions, such as the polymers extruded, the thickness of each film layer, and the apparatus used. In general, the extrusion temperature for each polymer should be as low as possible, such as to maintain the frost line as close to the die as possible.

In a preferred embodiment of the invention, the ratio:

$$\frac{\text{Lengthwise stretch ratio}}{\text{Frost line height (in cm)}}$$

is greater than 0.1, and preferably greater than 0.2.

The present invention also features a particular process for blow coextrusion to produce the films described above.

Other than bundling, the films according to the invention can be employed in all packing applications such as, for example, the manufacture of shrink overwraps for palletizing or bagging goods.

The invention features not only the packaging film, but also the products packaged with this film. More specifically, the invention features a package which comprises a linear array of articles to be bundled, such as beverage bottles and cans, and a thermoplastic film according to the invention shrunken around the articles such that the transverse direction of tear of the package is transverse to the packaging direction of the array of articles.

In order to further illustrate the present invention and the advantages thereof, the following specific examples are given, it being understood that same are intended only as illustrative and in nowise limitative.

EXAMPLE 1

The three-layer film described below was shaped from:
(a) Outer layer of resin A: 12.5% of total thickness;
(b) Intermediate layer of resin B: 75% of total thickness;
(c) Outer layer of resin A: 12.5% of total thickness;
(d) Total thickness: 70 μm.
  (i) resin A: modified ethylene/methacrylic acid copolymer neutralized with a sodium or zinc cation, having a fluidity index at 2.15 kg and 190° C. in accordance with the NFT 51016 standard of 0.5 g to 5 g and a density of 0.940 g/cm³;
  (ii) resin B: ethylene/vinyl acetate copolymer (comprising 2% or more of vinyl acetate) of fluidity index at 2.16 kg and 190° C. in accordance with NFT 51016 of 0.8 to 3 g and a density of 0.019 to 0.940 g/cm³.

Coextrusion was carried out at a screw temperature of 175° C. for resin A and 180° C. for resin B, the extruder end temperature being 190° C., a winding speed of 56 m/min, a blow ratio of 2, a die gap of 1.2 mm, a throughput of 120 kg/h, the extruder being a Windmöller machine, the lengthwise stretch ratio was 6.9 and frost line setting was about 65 cm. A film was produced for which the Elmendorf tear strength ratio (MD/TD) was greater than 7.

Under conventional bundling conditions, a variety of articles such as canned foods were packaged with these films. By simple initiation of tearing, by means of a tab cut out in the transverse direction when manufacturing the package, it was possible to open the pack simply by pulling the tab, providing a clean tear in the film without exerting any particular force. Before the tab was pulled, the film maintained all of its shrink and tear resistance properties required during its various handling operations.

EXAMPLE 2

A 45 μm film produced under the extrusion conditions of Example 1 was tested.

The results of tearing in accordance with the NFQ 03011 standard with tearing initiated were as follows:

|  | Tearing in centinewtons in the machine direction (MD) | Tearing in centinewtons in a direction substantially perpendicular thereto (TD) |
|---|---|---|
| Surlyn ® 1601 Single layer of 45 μm | 50 | 100 |
| Double layer of 45 μm: 20% Surlyn ® 1601 80% polyethylene | 500 | 100 |
| Triple layer of 45 μm: 16 Surlyn ® 1601 68% polyethylene 16% Surlyn ® 1601 | 500 | 100 |

The percentages reported are thickness percentages.

It will be appreciated that tear resistance in the substantially perpendicular direction of the co-extruded materials remained similar to that of the Surlyn® alone, while tearing in the machine direction increased up to values currently required for bundling purposes.

EXAMPLE 3

The following three-layer film was co-extruded:

| (i) | LDPE NOVEX ® 21H460 | 43.1 μm |
| (ii) | Surlyn ® 1601 | 28.7 μm |
| (iii) | LDPE Novex 21H460 | 43.1 μm |
|  | Total thickness | 115 μm |

Surlyn ® 1601 is an ionic copolymer marketed by Du Pont, of the sodium neutralized type having a melt index MI of 1.3.

Novex ® is a LDPE marketed by British Petroleum (BP) having a melt index of 1.5 and a density of 0,922.

The extruder for each layer was a Reifenhauser 50 mm extruder and the operating conditions thereof were as follows:

EXAMPLE 4

The operating conditions were as follows:

| Layer | Thickness |
|---|---|
| 1. LDPE Novex ® 21H460 | 43.1 μm |
| 2. Surlyn ® 1601 | 28.7 μm |
| 3. LDPE Novex 214460 | 43.1 μm |
| Total thickness | 115 μm |

The height of the frost line in this instance was 43 cm. The other operating parameters were identical to those of Example 3.

A film was produced for which the Elmendorf tear strengths and their ratio were the following:

$$\frac{MD}{TD} = \frac{35.2}{11.3} = 3.1$$

EXAMPLE 5

The constitution of the film was as follows:

| Layer | Thickness |
|---|---|
| 1. LDPE Novex ® 21H460 | 31 μm |
| 2. Surlyn ® 1601 | 21 μm |
| 3. LDPE Novex 214460 | 31 μm |
| Total thickness | 83 μm |

The operating conditions were identical to those of Example 4, except for the winding speed which was 9.4 m/min. A film was produced for which the Elmendorf tear strengths and their ratio were the following:

$$\frac{MD}{TD} = \frac{45.1}{10.3} = 4.4$$

EXAMPLE 6 (Comparative Example)

The operating conditions were identical to those of Example 5, but the frost line was set to 120 cm. In this instance, a film was produced for which the Elmendorf tear strengths and their ratio were the following:

| Layer | Extruder Temp. (°C.) | Speed of rotation rpm | Die block temp. (°C.) | Die Gap | Winding speed (m/min) | Blow ratio | Lengthwise stretch ratio | Frost line height (cm) |
|---|---|---|---|---|---|---|---|---|
| 1. LDPE | 180 | 60 |  |  |  |  |  |  |
| 2. Surlyn | 178 | 40 | 170 | 1.48 mm | 7.2 | 2.51 | 5.1 | 31 |
| 3. LDPE | 183 | 60 |  |  |  |  |  |  |

A film was produced for which the Elmendorf tear strengths and their ratio were the following:

$$\frac{MD}{TD} = \frac{39.9}{10.9} = 3.7$$

$$\frac{MD}{TD} = \frac{7.1}{9.1} = 0.7$$

EXAMPLE 7

The operating conditions were as follows:

| | Extruder | | | | | | | | |
|---|---|---|---|---|---|---|---|---|---|
| Layer | Thickness (μm) | Temp. (°C.) | Speed of rotation rpm | Die block temp. (°C.) | Die Gap | Winding speed (m/min) | Blow ratio | Lengthwise stretch ratio | Frost line height (cm) |
| 1. LDPE | 23.2 | 175 | 45 | | | | | | |
| 2. Surlyn | 15.5 | 176 | 30 | 170 | 1.48 mm | 9.4 | 2.51 | 9.5 | 34 |
| 3. LDPE | 180 | 180 | 45 | | | | | | |
| Thickness 62 μm (total) | | | | | | | | | |

A film was produced for which the Elmendorf tear strengths and their ratio were the following:

$$\frac{MD}{TD} = \frac{46.6}{4.2} = 11.1$$

EXAMPLE 8

The following operating conditions were employed:

| | Extruder | | | | | | | | |
|---|---|---|---|---|---|---|---|---|---|
| Layer | Thickness (μm) | Temp. (°C.) | Speed of rotation rpm | Die block temp. (°C.) | Die Gap | Winding speed (m/min) | Blow ratio | Lengthwise stretch ratio | Frost line height (cm) |
| 1. LDPE | 40 | 178 | 45 | | | | | | |
| 2. Surlyn | 26 | 178 | 30 | 170 | 1.48 mm | 9.4 | 1.5 | 9.3 | 70 |
| 3. LDPE | 40 | 180 | 45 | | | | | | |
| Thickness 106 μm (total) | | | | | | | | | |

A film was produced for which the Elmendorf tear strengths and their ratio were the following:

$$\frac{MD}{TD} = \frac{67.1}{12.8} = 5.2$$

EXAMPLE 9

A film of the following composition:

| Layer 1: | A mixture of: | 80% by weight LDPE (d: 0.923; MI: 0.30) |
| | | 20% by weight HDPE (d: 0.963; MI: 8.0) |
| | and containing: | 750 ppm SiO$_2$ |
| | | 1,000 ppm alkyl amine |
| Layer 2: | Surlyn ® 1601 | |
| Layer 3: | identical to layer 1 | |
| | was extruded under the following operating conditions; | |

| | Extruder | | | | | | | | |
|---|---|---|---|---|---|---|---|---|---|
| Layer | Thickness (%) | Temp. (°C.) | Speed of rotation rpm | Die block temp. (°C.) | Die Gap | Winding speed (m/min) | Blow ratio | Lengthwise stretch ratio | Frost line height (cm) |
| 1. | 37.5 | 172.5 | 160 | | | | | | |
| 2. | 25 | 172.5 | 45 | 177.5 | 177.5 | 1.2 mm | 2.9 | 6.0 | 54 |
| 3. | 37.5 | 172.5 | 58 | | | | | | |
| Total 100% | | | | | | | | | |

A film was produced for which the Elmendorf tear test provided the following ratio:

$$\frac{MD}{TD} = 7.2$$

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A shrinkable coextrudate thermoplastic film packaging material comprising (a) at least one layer of a polyolefin; and (b) at least one layer of an ionic copolymer which comprises the copolymerizate of (1) an α-olefin of formula R—CH=CH$_2$ wherein R is hydrogen or an alkyl radical having from 1 to 8 carbon atoms, with (2) an α,β-ethylenically unsaturated carboxylic acid having from 3 to 8 carbon atoms, and, (3) 0–20% by weight of at least one other monoethylenically unsaturated comonomer, with the proviso that from 10% to 90% of the caroxylic acid functional groups of said copolymer are ionized by means of metallic ions distributed over the copolymer, and said film being shaped by coextrusion of (a) said polyolefin layer and (b) said ionic copolymer layer under the following operating conditions:

(i) a lengthwise stretch ratio of 2 to 25; and
(ii) a frost line height of less than 160 cm; the ratio $$\frac{\text{Lengthwise stretch ratio}}{\text{Frost line height (in cm)}}$$

being such as to provide a ratio of:

$$\frac{\text{Elmendorf tear strength in machine direction}}{\text{Elmendorf tear strength in substantially perpendicular direction}}$$

greater than or equal to 2.

2. The shrinkable thermoplastic film as defined by claim 1, said lengthwise stretch ratio ranging from 4 to 15, and said frost line height being less than 80 cm.

3. The shrinkable thermoplastic film as defined by claim 1, said lengthwise stretch ratio ranging from 5 to 10, and said frost line height ranging from 20 to 40 cm.

4. The shrinkable thermoplastic film as defined by claim 1, wherein said ratio:

$$\frac{\text{Lengthwise stretch ratio}}{\text{Frost line height (in cm)}}$$

is greater than 0.1.

5. The shrinkable thermoplastic film as defined by claim 4, wherein said ratio:

$$\frac{\text{Lengthwise stretch ratio}}{\text{Frost line height (in cm)}}$$

is greater than 0.2.

6. The shrinkable thermoplastic film as defined by claim 1, wherein said ratio:

$$\frac{\text{Elmendorf tear strength in machine direction}}{\text{Elmendorf tear strength in substantially perpendicular direction}}$$

is greater than 5.

7. The shrinkable thermoplastic film as defined by claim 1, said coextrusion being under the following operating conditions:
   (i) an extrusion screw temperature for the ionic copolymer ranging from 165° to 220° C.;
   (ii) an extrusion screw temperature for the polyolefin ranging from 170° to 220° C.;
   (iii) an extrusion die temperature ranging from 175° to 230° C.;
   (iv) a blow ratio ranging from 1 to 4;
   (v) a winding speed ranging from 5 to 80 m/min; and
   (vi) a die block gap ranging from 0.6 to 2.0 mm.

8. The shrinkable thermoplastic film as defined by claim 1, said coextrusion being by blow coextrusion under the following operating conditions:
   (i) an extrusion screw temperature for the ionic copolymer ranging from 170° to 180° C.;
   (ii) an extrusion screw temperature for the polyolefin ranging from 175° to 185° C.;
   (iii) an extrusion die temperature ranging from 185° to 195° C.;
   (iv) a blow ratio ranging from 1.5 to 2.5;
   (v) a lengthwise stretch ratio ranging from 4 to 20;
   (vi) a winding speed ranging from 7 to 50 m/min; and
   (vii) a die block gap ranging from 1 to 1.6 mm, with the proviso that (viii) the frost line height is such that the ratio $$\frac{\text{Lengthwise stretch ratio}}{\text{Frost line height (in cm)}}$$

is greater than 0.1.

9. The shrinkable thermoplastic film as defined by claim 1, said ionic copolymer comprising a copolymer of ethylene and a mono- or dicarboxylic acid in which the metal ions are complexed metal ions of Groups II, III, IV-A or VIII of the Periodic Table.

10. The shrinkable thermoplastic a defined by claim 9, said ionic copolymer comprising a copolymer of ethylene and mono- or dicarboxylic acid in which the metal ions are alkali metal ions.

11. The shrinkable thermoplastic film as defined by claim 10, said metal ions being sodium ions.

12. The shrinkable thermoplastic film as defined by claim 1, said polyolefin comprising a homopolymer of an R'—CH—CH$_2$ α-olefin in which R' is hydrogen or an alkyl radical having from 1 to 8 carbon atoms.

13. The shrinkable thermoplastic film as defined by claim 1, said polyolefin being polyethylene.

14. The shrinkable thermoplastic film defined by claim 13, said polyethylene comprising low density polyethylene (LDPE).

15. The shrinkable thermoplastic as defined by claim 13, said polyethylene comprising a mixture of low density polyethylene and high density polyethylene (LDPE/HDPE).

16. The shrinkable thermoplastic film as defined by claim 15, wherein the weight ratio of low density polyethylene and high density polyethylene (LDPE/HDPE) ranges from 95/5 to 50/50.

17. The shrinkable thermoplastic film as defined by claim 1, said polyolefin comprising a copolymer of an R'—CH=CH$_2$ α-olefin in which R' is hydrogen or an alkyl radical having 1 to 8 carbon atoms, and a monoethylenically unsaturated comonomer.

18. The shrinkable thermoplastic film a defined by claim 17, said polyolefin comprising an ethylene/vinyl acetate (EVA) copolymer.

19. The shrinkable thermoplastic film as defined by claim 1, wherein the total thickness of said layer or layers of ionic copolymer constitutes from 5% to 70% of the total thickness thereof.

20. The shrinkable thermoplastic film as defined by claim 1, wherein the total thickness of the ionic copolymer layer or layers constitutes from 15% to 40% of the total thickness thereof.

21. The shrinkable thermoplastic as defined by claim 1, wherein the thickness thereof ranges from 20 to 300 μm.

22. The shrinkable thermoplastic film as defined by claim 21, wherein the thickness thereof ranges from 20to 150 μm.

23. The shrinkable thermoplastic film as defined by claim 1, including two discrete layers.

24. The shrinkable thermoplastic film as defined by claim 1, comprising at least three discrete layers.

25. The shrinkable thermoplastic film as defined by claim 24, comprising two outer layers of said ionic copolymer and each constituting from 10% to 25% of the total thickness thereof.

26. The shrinkable thermoplastic as defined by claim 24, comprising three layers, the internal layer of which comprises said ionic copolymer constituting from 10% to 35% of the total film thickness.

27. At least one article packaged within the shrinkable thermoplastic film as defined by claim 1, said thermoplastic film being shrunk around said at least one article.

28. A linear array of articles packaged within the shrinkable thermoplastic film as defined by claim 1, said thermoplastic film being shrunk around said linear array and the transverse direction of tear of which being transverse to the packaging direction of said linear array.

29. A shrinkable coextrudate thermoplastic film packaging material comprising (a) at least one layer of a polyolefin; and (b) at least one layer of an ionic copolymer which comprises the copolymerizate of (1) an α-olefin of formula R—CH=CH$_2$ wherein R is hydrogen or an alkyl radical having from 1 to 8 carbon atoms, with (2) an α,β-ethylenically unsaturated carboxylic acid having from 3 to 8 carbon atoms, with the proviso that from 10% to 90% of the carboxylic acid functional groups of said copolymer are ionized by means of metallic ions distributed over the copolymer, and said film having a ratio of;

$$\frac{\text{Elmendorf tear strength in machine direction}}{\text{Elmendorf tear strength in substantially perpendicular direction}}$$

greater than or equal to 2 and providing a tear direction substantially perpendicular to a direction of extrusion.

30. The shrinkable coextrudate thermoplastic film packaging material of claim 29, said film having a tear direction that is substantially in a straight line.

31. The shrinkable coextrudate thermoplastic film packaging material of claim 1, wherein said at least on other monoethylenically unsaturated comonomer is present in an amount of 1–10% by weight.

* * * * *